Jan. 14, 1958 G. A. LYON Re. 24,417

WHEEL COVER

Original Filed Aug. 13, 1952

Inventor

George Albert Lyon

Hill, Sherman, Meroni, Gross & Simpson Attys

United States Patent Office

Re. 24,417
Reissued Jan. 14, 1958

24,417

WHEEL COVER

George Albert Lyon, Detroit, Mich.

Original No. 2,737,421, dated March 6, 1956, Serial No. 304,097, August 13, 1952. Application for reissue September 28, 1956, Serial No. 612,907

18 Claims. (Cl. 301—37)

Matter enclosed in heavy brackets [ ] appears in the original patent but forms no part of this reissue specification; matter printed in italics indicates the additions made by reissue.

The present invention relates to improvements in wheel structure and more particularly concerns the ornamental and protective covering of the outer side of vehicle wheels.

An important object of the present invention is to provide an improved wheel structure having a cover thereon which can be readily applied and removed at will but which is self-retaining on the wheel effectively in service.

Another object of the invention is to provide a wheel structure having thereon an improved ventilating type of wheel cover having means at the outer margin effective to reinforce the cover and also useful in facilitating pry-off of the cover when it is desired to remove the same from the wheel.

A further object of the invention is to provide a novel wheel cover for vehicle wheels, provided with substantially improved means for retaining the cover on the wheel.

Still another object of the invention is to provide a wheel cover having improved air circulation promoting type retaining finger structure and tensioning means.

According to the general features of the present invention there is provided in a wheel structure having a multi-flange tire rim and a wheel body with air circulation openings between the wheel body and the tire rim, a cover for the outer side of the wheel including a body member having a continuous marginal flange structure and an intermediate portion, said intermediate portion having a series of air circulation openings therethrough with retaining finger flanges at said opening retainingly engaging with the tire rim under tension.

According to other features of the invention there is provided in a wheel cover for disposition at the outer side of the vehicle wheel, a cover body having a circular portion thereof provided with a series of air circulation openings, said circulation openings having projecting inwardly therefrom retaining flanges provided with edges retainingly engageable under tension with a wheel part, and a marginal reinforcing continuous rim on said cover outwardly of said openings for stiffening the margin of the cover and providing a pry-off shoulder structure at the cover margin.

Other objects, features and advantages of the present invention will be readily apparent from the following detailed description of a preferred embodiment thereof taken in conjunction with the accompanying drawing, in which.

As shown on the drawing.

Figure 2:
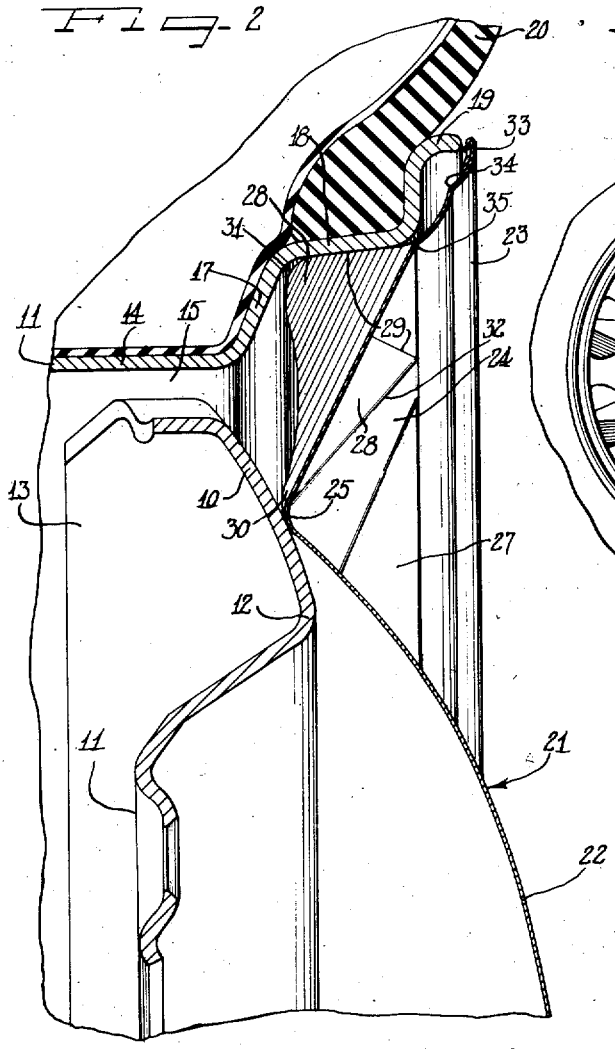
Figure 2 is an enlarged fragmentary radial sectional detail view taken substantially on the line II—II of Figure 1.

A wheel with which the present invention is adapted to be used may comprise a wheel body 10 and a tire rim 11. The wheel body is preferably of the disk spider type including a central bolt-on flange 11, an intermediate axially outwardly extending annular reinforcing nose bulge 12 and a marginal axially directed outer flange 13 which is secured in suitable manner to a base flange 14 of the tire rim and provides at spaced intervals ventilation openings 15 between the margin of the wheel body and the base flange of the tire rim.

The tire rim 11 is preferably of the multi-flange, drop-center type which may be formed as a rolled section and has extending generally radially and axially outwardly from the base flange an outer side flange 17 which merges with a generally axially outwardly and radially outwardly obliquely sloping intermediate flange 18 which in turn merges with a terminal flange 19. The tire rim is adapted to support a pneumatic tire and the assembly 20.

For ornamentally and protectively covering the outer side of the wheel, a wheel cover 21 is provided. Although the cover is shown as comprising a full disk which covers not only the wheel body 10 but also the tire rim 11, it will be understood that the cover may comprise a ring which is open at the center so that a conventional hub cap can be applied. Substantial advantages, however, are attained by having the cover formed from a single piece of sheet metal comprising a central bulged crown portion 22, an outer marginal portion 23 and an intermediate portion 24. The central crown portion 22 is preferably dimensioned to cover the bolt-on flange portion of the wheel body 10 and preferably the nose bulge 12 of the wheel body with the margin of the central or crown portion of the cover adapted to rest against the radially outer side of the nose bulge 12. The outer marginal portion 23 of the cover is preferably of a diameter to substantially conceal the terminal flange 19 of the tire rim, while the intermediate portion 24 of the cover extends in overlying relation to the remainder of the tire rim and the adjacent portion of the wheel body 10 opposite the wheel openings 15 at juncture of the tire rim and the wheel body.

As best seen in Figure 2, the intermediate portion 24 of the cover is preferably formed to extend obliquely generally radially and axially outwardly and joins the crown portion 22 on an annular reinforcing rib 25 which projects generally axially inwardly and seats against the wheel body. At spaced intervals, the intermediate portion 24 of the cover is preferably provided with a symmetrical series of air circulation or ventilation openings 27 which since they are opposite the ventilation openings 15 of the wheel afford circulation of air through the cover and through the wheel and thus facilitate cooling of the brake drum of a vehicle axle structure (not shown) to which the wheel may be applied in service.

Figure 1:
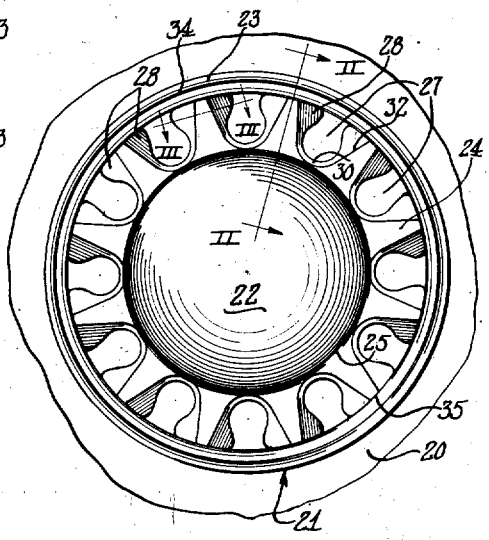
Figure 1 is a side elevational view of a vehicle wheel and wheel cover according to the present invention.

Means for attaching the cover 21 to the wheel comprise a series of cover retaining lobe-like retaining finger flanges 28. In the present instance the flanges 28 are provided by material struck from the intermediate cover portion 24 in the formation of the openings 27. To this end the retaining flanges 28 are provided at each side of each of the openings 27 in preferably symmetrical formation, with each of the flanges provided a *radially and axially inclined* cover retaining edge 29 which projects radially outwardly for cover retaining engagement with the inner side of the intermediate flange 18 of the tire rim. The retaining flanges 28 are preferably angled toward one another from opposite sides of the respective associated openings 27, and each pair of the retaining flanges 28 at each opening is connected by a narrow marginal connecting flange 30 extending inwardly from the inner portions of the respective openings 27. The radially outer portions of the retaining flanges 28 are of substantial width and the flanges taper toward a narrower dimension at the connecting flanges 30. Thereby the openings 27 are provided with a generally keyhole shape as best seen in Figure 1. The retaining flanges 28 are widest at their retaining edge portions.

The retaining edges 29 of the retaining flanges 28 are disposed on a normal diameter which is slightly greater than the inner diameter of the intermediate flange 18 of the tire rim in the corresponding or complementary portions of the intermediate flange and the retaining edges 29 considered from the outer ends of the edges 29 toward the inner ends thereof, so that when the cover is applied to the wheel by centering the same and pushing the cover axially inwardly so as to cam the retaining edges 29 inwardly along the intermediate flange 18, the flanges 28 are placed under retaining stress. The width of the flanges 28 assures substantial resilience. It will be observed that at the inner ends of the retaining edges 29 the lobes of the retaining flanges are rounded off as indicated at 31 so as to facilitate inward camming of the retaining edges in application of the cover to the wheel.

Figure 3:
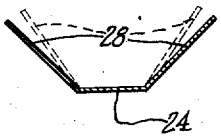
Figure 3 is a fragmentary enlarged sectional detail view taken substantially along the line III—III of Figure 1.

In Figure 3 in full line is shown the relative disposition of the retaining flanges 28 when in cover retaining relation on the wheel with the retaining edges thereof engaging the intermediate flange of the tire rim. In dotted outline is shown the normal relationship of the retaining flanges 28 in their unstressed condition when the cover is off the wheel. It will thus be appreciated that the retaining flanges 28 are subjected to substantial retaining stress which causes the retaining edges 29 of the retaining flanges to wedge tightly in cover retaining relation against the tire rim intermediate flange 18. Furthermore, inasmuch as the retaining flanges 28 generally oppose one another in peripheral directions about the wheel, it will be appreciated that the cover is very effectively retained against turning on the wheel as a result of spinning or torque forces imparted to the cover in running of the wheel in service. The connecting flanges 30 afford substantial mutual resistance of the flanges 30 to distortion or flexure, and also provide a finishing margin about the edges defining the openings 27.

By virtue of the openings 27 in the intermediate portion 24 of the cover, the solid areas of the intermediate portions intervening between the openings 27 provide spoke-like portions which connect the crown 22 with the marginal portion 23 of the cover. By preference the arrangement is such that the spoke-like intervening portions taper from wide base portions at the juncture 25 with the crown portion 22 toward substantially narrower outer end portions at juncture with the outer marginal portion 23 of the cover. The juncture of the flanges 28 and 30 with the intermediate cover portion at the respective openings 27 is preferably on angular respective reinforcing juncture ribs 32 at the respective openings. This construction rigidifies the spoke-like portions of the intermediate cover section against buckling under the resilient stress to which subjected by forcing of the air circulation promoting vanes or retaining flanges 28 resiliently into retaining engagement with the wheel.

The outer marginal portion 23 of the cover is constructed to afford a substantial rigidifying perimeter for the cover and for this purpose the portion 23 is preferably formed of rib-like arcuate cross-section with an underturned marginal reinforcing flange 33 at its extremity, an intermediate annular indented reinforcing rib 34 and an annular indented reinforcing rib 35 at juncture with the spoke ends of the intermediate cover portion 24. In the full assembly of the cover with the wheel of the outer annular portion 23 is preferably spaced from the terminal flange 19 of the tire rim. This affords a chamber therebehind with the intermediate flange for accommodating wheel balancing weights. In addition, the spaced relation of the outer marginal portion facilitates the insertion of a pry-off tool therebehind to fulcrum on the terminal edge of the terminal flange 19 for prying the cover from the wheel by thus locking the retaining flanges 28 from the intermediate flange 18 of the tire rim. It will be appreciated that the successive reinforcing ribs or shoulders afforded by the outer extremity underturned flange 33, then by the intermediate rib 34 and then by the inner rib 35, application of axially outward force to the outer marginal portion of the cover can be effected efficiently and without damaging the cover. The strongly reinforced continuous ring-like outer marginal or rim portion 23 of the cover also serves as retaining means which prevents the spoke-like portions of the intermediate cover portion from bending out of line, but maintains all of the spoke-like portions in proper operative position and providing solid backing for the several retaining flanges 28, not only when applying the cover to the wheel, but during retention of the cover on a wheel and also in prying the cover from the wheel.

The present application is a continuation-in-part of my applications Serial No. 259,546, filed December 3, 1951, and Serial No. 259,793, filed December 4, 1951, both now abandoned.

It will be understood that modifications and variations may be effected without departing from the scope of the novel concepts of the present invention.

I claim as my invention:

1. In a wheel structure having a multi-flange tire rim and wheel body with air circulation, openings between the wheel body and the tire rim, a cover for the outer side of the wheel including a body member having a continuous marginal flange structure and an intermediate portion, said intermediate portion having a series of air circulation openings therethrough with retaining finger flanges at said openings, said finger flanges having generally radially outwardly directed edges retainingly engaging with a flange of the tire rim under tension in the finger flanges resulting from flexure thereof incident to the placing of the same in the retaining engagement with the tire rim flange.

2. In a wheel structure including a tire rim and a wheel body having ventilation openings therethrough and wherein the tire rim includes a generally axially and radially outwardly tapering intermediate flange joining a terminal flange, a cover for the outer side of the wheel comprising a cover body including an annular portion having a series of air circulation openings therethrough and provided with cover retaining flanges at said openings including radially outwardly extending edges retainingly engageable with said intermediate flange, the cover having an outer marginal reinforced annular portion reinforcing the outer portions of the annular cover portion intervening between said openings to maintain all of said intervening portions in proper alignment and also serving as a pry-off shoulder structure.

3. In a wheel structure including a tire rim and a wheel body having ventilation openings therethrough and the tire rim having a generally axially outwardly and slightly radially outwardly tapering flange and a terminal flange at the outer side of said tapering flange, a cover for the outer side of the wheel comprising a circular cover member including a portion having a series of openings therethrough for cooperation with the wheel openings for air circulation, said openings being defined by cover retaining flanges having radially extending edges engageable retainingly with the tapering flange of the tire rim, and a marginal annular portion on the cover spaced from the tire rim and having a plurality of annular pry-off shoulders disposed radially outwardly from said retaining flanges.

4. In a wheel structure including a tire rim and a wheel body having ventilation openings therethrough and wherein the tire rim includes a generally axially and radially outwardly tapering intermediate flange joining a terminal flange, a cover for the outer side of the wheel comprising a cover body including an annular portion having a series of air circulation openings therethrough and provided with cover retaining flanges at said openings including radially outwardly extending edges retainingly engageable with said intermediate flange, the cover having an outer marginal reinforced annular portion reinforcing the outer portions of the annular cover portion intervening between said openings to maintain all of said intervening portions in proper alignment and also serving as a pry-off shoulder structure, and an annular continuous indented rib on the cover at the radially inner side of said openings through the cover and engageable with the wheel body.

5. In a cover for disposition at the outer side of a vehicle wheel, a circular sheet metal cover body having an inner circular portion and a circular radially outer portion divergently connected together at an axially inward juncture, said radially outer cover portion extending generally radially and axially outwardly and having an annular series of openings therein, said openings flaring radially outwardly, and the respective openings having spaced pairs of generally inwardly directed wing-like retaining finger flanges providing radially outwardly directed wheel engaging edges, said openings being closed at their radially outer sides by a continuous annular marginal part of said radially outer portion of the cover.

6. In a cover for disposition at the outer side of a vehicle wheel, a circular sheet metal cover body having an annular series of openings therein, said openings flaring radially outwardly, and the respective opposite sides of said openings having generally inwardly directed wing-like retaining finger flanges providing radially outwardly directed wheel engaging edges, said openings being closed at their radially outer sides by a continuous annular portion of the cover, said annular opening-closing portion having a plurality of annular reinforcing ribs adapted to be engageable by a pry-off tool.

*7. In a wheel structure including a wheel having a body and a multi-flanged rim including an intermediate generally axially inclined flange, a circular wheel cover including an outer annular portion having rearwardly projecting therefrom a plurality of divergent elements spaced in circular manner around the wheel axis, each with a radially outer edge portion for engaging said intermediate rim flange and for resisting turning of the cover on the wheel, said divergent elements converging in a direction axially outward of the cover and being cammingly movable apart in a circumferential direction upon engagement with said rim flange.*

*8. In a wheel structure including a wheel having a body and a multi-flanged rim including an intermediate generally axially inclined flange, a circular wheel cover including an outer annular portion having rearwardly projecting therefrom a plurality of divergent elements spaced in circular manner around the wheel axis, each with a radially outer edge portion for engaging said intermediate rim flange and for resisting turning of the cover on the wheel, said divergent elements converging in a direction axially outward of the cover and being cammingly movable apart in a circumferential direction upon engagement with said rim flange, said elements being arranged in spaced pairs with the elements of each pair being inclined away from each other in the general direction of said intermediate rim flange.*

*9. In a wheel structure including a wheel having a body and a multi-flanged rim including an intermediate generally axial inclined flange, a circular wheel cover for disposition on the wheel with an outer peripheral portion disposed over said rim and having an intermediate shouldered portion provided on its rear side with a plurality of circumferentially spaced elements pressed therefrom and projecting radially outward toward said intermediate rim flange, said elements having terminal edges inclined relative to an axial plane through the cover for gripping said intermediate rim flange to aid in centering the cover member and for resisting turning of said member on the wheel.*

*10. In a wheel structure including a wheel having a body and a multi-flanged rim including an intermediate generally axial inclined flange, a circular wheel cover for disposition on the wheel with an outer peripheral portion disposed over said rim and having an intermediate shouldered portion provided on its rear side with a plurality of circumferentially spaced elements pressed therefrom and projecting radially outward toward said intermediate rim flange, said elements having terminal edges inclined relative to an axial plane through the cover for gripping said intermediate rim flange to aid in centering the cover member and for resisting turning of said member on the wheel, said cover portion having air circulation openings at areas from which said elements are pressed.*

*11. In a wheel structure including a wheel having a body and a multi-flanged rim including an intermediate generally axial inclined flange, a circular wheel cover for disposition on the wheel with an outer peripheral portion disposed over said rim and having an intermediate shouldered portion provided on its rear side with a plurality of circumferentially spaced elements pressed therefrom and projecting radially outward toward said intermediate rim flange, said elements having terminal edges inclined relative to an axial plane through the cover for gripping said intermediate rim flange to aid in centering the cover member and for resisting turning of said member on the wheel, said cover portion having air circulation openings at areas from which said elements are pressed, each of said elements being in close proximity to a corresponding opening as to serve as a vane for promoting circulation of air through the opening in the rotation of the wheel.*

*12. In a wheel structure including a member having an annular shoulder comprising a flange, a cover member for disposition at the outer side of the wheel and having projected from the inner side thereof divergent resiliently flexible generally radial wings disposed in planes oblique to the axis of the cover and terminating in edges for detachable gripping engagement with the wheel shoulder flange, said wings being movable apart upon initial engagement with said flange and movable toward each other thereafter to engage the flange and resiliently resist displacement of the cover from engagement therewith.*

*13. In a wheel including a tire rim having a generally axially outwardly extending flange, a wheel cover for disposition at the outer side of the wheel including an annular series of retaining fins having their major planes directed generally axially and including radially outer edges for retainingly engaging said flange to retain the cover on the wheel, said fins being struck out from the cover and thereby affording a series of strike-out openings for air circulation through the cover.*

*14. In a wheel structure including a tire rim having an intermediate flange, a circular wheel cover for substantially concealing the tire rim and extending substantially radially inwardly therebeyond, an intermediate annular portion of the cover having an annular series of flange fins projecting in their respective major planes generally axially inwardly and radially and having radially outer edges retainingly engaging said intermediate tire rim flange.*

*15. In a wheel cover for disposition at the outer side of a vehicle wheel, said cover having an intermediate annular generally frusto-conical portion, and retaining elements projecting generally axially inwardly from said frusto-conical portion and having radially projecting edges extending along lines transverse to the periphery of the cover for retaining engagement with a portion of a vehicle wheel to which the cover may be applied.*

*16. In a wheel structure including a tire rim and a wheel body and wherein the wheel body provides air circulation openings, a cover for the outer side of the wheel retained thereon and including a plurality of air circulation openings therethrough, each of said openings being defined by a generally U-shaped flange structure providing generally radially extending air circulation promoting fins having edges engaging the tire rim under tension in press-on, pry-off relation.*

*17. In a wheel structure including a tire rim having a generally radially inwardly facing annular flange, a covering member for the outer side of the wheel including a portion for overlying the tire rim, said portion having fin flange means therebehind for retaining engagement with said flange of the tire rim, said fin flange means including a flange extending behind said portion in a plane lying generally radially and axially relative to the perimeter of the member but extending slanted relative to the axis of the cover member and said annular rim flange and provided with a generally radially outwardly facing edge with its major extent in said slanted relation and engageable under resilient tensioned radially outward thrust retainingly against said rim flange.*

*18. In a wheel structure including a generally axially extending and radially facing annular flange, a wheel covering member for disposition at the outer side of the wheel, said member having a series of circumferentially spaced fin vanes of substantial face area with the faces disposed to face generally circumferentially of the cover and providing generally radially facing and axially extending edges engageable under resilient cover retaining gripping relation against said annular wheel flange, and with the portions of the fin vanes adjacent said edges being alternately oppositely angled to the axis of the*

*cover member and the wheel and to a line tangent to the circumference defined by said wheel flange.*

References Cited in the file of this patent or the original patent

UNITED STATES PATENTS

| | | |
|---|---|---|
| Re. 22,042 | Lyons | Mar. 3, 1942 |
| 550,723 | Morgan | Dec. 3, 1895 |
| 1,509,937 | Down | Sept. 30, 1924 |
| 1,800,173 | Anderson | Apr. 7, 1931 |
| 1,889,070 | Hyatt | Nov. 29, 1932 |
| 2,092,975 | Hunt et al. | Sept. 14, 1937 |
| 2,115,182 | Sinclair | Apr. 26, 1938 |
| 2,148,213 | Lyon | Feb. 21, 1939 |
| 2,166,695 | Van Halteren | July 18, 1939 |
| 2,276,405 | Lyon | Mar. 17, 1942 |
| 2,368,228 | Lyon | Jan. 30, 1945 |
| 2,368,238 | Lyon | Jan. 30, 1945 |
| 2,386,236 | Lyon | Oct. 9, 1945 |
| 2,595,873 | Mulhern | May 6, 1952 |
| 2,761,530 | Dawley | Sept. 4, 1956 |
| 2,785,777 | Horn | Mar. 19, 1957 |

FOREIGN PATENTS

| | | |
|---|---|---|
| 812,968 | France | Feb. 15, 1937 |